United States Patent
Olsen, III et al.

(10) Patent No.: US 9,026,304 B2
(45) Date of Patent: May 5, 2015

(54) VEHICLE MAINTENANCE SYSTEMS AND METHODS

(75) Inventors: John A. Olsen, III, Cumming, GA (US); Matthew S. Hendrix, Canton, GA (US); Helen M. Bush, Atlanta, GA (US); David L. Bradley, Alpharetta, GA (US)

(73) Assignee: United Parcel Service of America, Inc.

(*) Notice: Subject to any disclaimer, the term of this patent is extended or adjusted under 35 U.S.C. 154(b) by 264 days.

(21) Appl. No.: 12/419,818

(22) Filed: Apr. 7, 2009

(65) Prior Publication Data
US 2009/0254240 A1 Oct. 8, 2009

Related U.S. Application Data

(60) Provisional application No. 61/043,124, filed on Apr. 7, 2008.

(51) Int. Cl.
*G07C 5/00* (2006.01)
*G06Q 10/06* (2012.01)
*G06Q 50/04* (2012.01)

(52) U.S. Cl.
CPC ............ *G06Q 10/06* (2013.01); *G06Q 50/04* (2013.01); *G07C 5/006* (2013.01); *G07C 5/008* (2013.01)

(58) Field of Classification Search
CPC ....... G06Q 10/06; G06Q 50/04; G07C 5/006; G07C 5/008
USPC ........ 701/29, 33, 29.1, 29.3, 29.4, 29.5, 31.4, 701/31.6, 31.9, 32.1, 32.9, 33.7, 33.8
See application file for complete search history.

(56) References Cited

U.S. PATENT DOCUMENTS

| | | | |
|---|---|---|---|
| 3,526,127 A | 9/1970 | Sarkis | |
| 4,773,011 A | 9/1988 | VanHoose | |
| 4,809,540 A * | 3/1989 | Lackner et al. | ............ 73/114.23 |
| 4,945,759 A | 8/1990 | Krofchalk et al. | |
| 5,041,976 A | 8/1991 | Marko et al. | |
| 5,060,156 A | 10/1991 | Vajgart et al. | |
| 5,491,631 A | 2/1996 | Shirane et al. | |
| 5,815,093 A | 9/1998 | Kikinis | |

(Continued)

OTHER PUBLICATIONS

"Oil Lasts Longer in Diesels, thanks to novel viscosity sensor", Dec. 14, 2006, pp. 1-3;http://machinedesign.com/ContentItem/57322/Oillastslongerindieselsthankstonovelviscositysensor.aspx.

(Continued)

*Primary Examiner* — Darnell Jayne
*Assistant Examiner* — Stanton L Krycinski
(74) *Attorney, Agent, or Firm* — Alston & Bird LLP

(57) ABSTRACT

A system that enables a fleet of vehicles to be maintained is provided. The disclosed system allows a fleet operator to review the history of the vehicles in the fleet along with vehicle sensor data to identify earmarks in the vehicle sensor data that are predictive of faults that the vehicles have experienced. The operator develops statistical algorithms that can detect an earmark in vehicle sensor data. The system then collects vehicle sensor data and applies the statistical algorithms to the vehicle data to determine if a potential fault is going to occur in a vehicle. In response to determining that a potential fault is going to occur, the disclosed system automatically alerts the vehicle driver, automatically schedules a maintenance visit, automatically checks the fleet inventory for components required for a maintenance visit and orders unavailable components, and automatically dispatches the components to the mechanic.

33 Claims, 9 Drawing Sheets

(56) References Cited

U.S. PATENT DOCUMENTS

| | | |
|---|---|---|
| 5,928,291 A | 7/1999 | Jenkins et al. |
| 6,084,870 A | 7/2000 | Wooten et al. |
| 6,091,325 A * | 7/2000 | Zur et al. ................ 340/455 |
| 6,092,021 A | 7/2000 | Ehlbeck et al. |
| 6,112,152 A | 8/2000 | Tuttle |
| 6,181,994 B1 | 1/2001 | Colson et al. |
| 6,253,129 B1 | 6/2001 | Jenkins et al. |
| 6,301,531 B1 * | 10/2001 | Pierro et al. ................ 701/29 |
| 6,306,063 B1 | 10/2001 | Horgan et al. |
| 6,324,659 B1 | 11/2001 | Pierro |
| 6,330,499 B1 | 12/2001 | Chou et al. |
| 6,338,152 B1 | 1/2002 | Fera et al. |
| 6,389,337 B1 | 5/2002 | Kolls |
| 6,424,157 B1 * | 7/2002 | Gollomp et al. ............. 324/430 |
| 6,438,471 B1 * | 8/2002 | Katagishi et al. ........... 701/31.4 |
| 6,459,969 B1 | 10/2002 | Bates et al. |
| 6,462,675 B1 | 10/2002 | Humphrey et al. |
| 6,484,080 B2 | 11/2002 | Breed |
| 6,498,986 B1 | 12/2002 | Kurtzberg et al. |
| 6,509,749 B1 | 1/2003 | Buelna et al. |
| 6,525,672 B2 | 2/2003 | Chainer et al. |
| 6,549,833 B2 * | 4/2003 | Katagishi et al. ........... 701/31.6 |
| 6,553,816 B1 * | 4/2003 | Palanisamy et al. ....... 73/114.59 |
| 6,594,579 B1 | 7/2003 | Lowery et al. |
| 6,604,033 B1 | 8/2003 | Banet et al. |
| 6,609,051 B2 * | 8/2003 | Fiechter et al. ................ 701/33 |
| 6,611,740 B2 | 8/2003 | Lowery et al. |
| 6,636,790 B1 | 10/2003 | Lightner et al. |
| 6,651,034 B1 * | 11/2003 | Hedlund et al. ............ 702/183 |
| 6,662,091 B2 * | 12/2003 | Wilson et al. ............... 701/33 |
| 6,675,635 B2 | 1/2004 | Kasen et al. |
| 6,732,031 B1 | 5/2004 | Lightner et al. |
| 6,732,063 B2 * | 5/2004 | Famili et al. ............... 702/188 |
| 6,735,504 B2 * | 5/2004 | Katagishi et al. ........... 701/31.6 |
| 6,735,506 B2 * | 5/2004 | Breed et al. ................ 701/36 |
| 6,738,697 B2 * | 5/2004 | Breed ........................ 701/31.5 |
| 6,741,938 B2 | 5/2004 | Berndorfer |
| 6,775,642 B2 | 8/2004 | Remboski et al. |
| 6,819,988 B2 | 11/2004 | Dietz et al. |
| 6,840,093 B2 | 1/2005 | Kasen et al. |
| 6,847,871 B2 | 1/2005 | Malik et al. |
| 6,850,824 B2 * | 2/2005 | Breed ........................ 701/36 |
| 6,857,262 B2 | 2/2005 | Rendahl et al. |
| 6,859,039 B2 | 2/2005 | Horie et al. |
| 6,911,830 B2 | 6/2005 | Heremans et al. |
| 6,920,779 B2 | 7/2005 | Carlstrom et al. |
| 6,947,827 B2 | 9/2005 | Fuse et al. |
| 6,988,026 B2 * | 1/2006 | Breed et al. ................ 701/31.4 |
| 7,016,774 B2 * | 3/2006 | Barber et al. ................ 701/30 |
| 7,050,897 B2 * | 5/2006 | Breed et al. ................ 701/46 |
| 7,075,421 B1 | 7/2006 | Tuttle |
| 7,082,359 B2 * | 7/2006 | Breed ........................ 701/36 |
| 7,089,099 B2 * | 8/2006 | Shostak et al. ............. 701/29.6 |
| 7,089,784 B2 | 8/2006 | Jakoby et al. |
| 7,103,460 B1 * | 9/2006 | Breed ........................ 701/32.9 |
| 7,133,804 B2 * | 11/2006 | Tonack et al. .............. 702/184 |
| 7,146,264 B2 | 12/2006 | Bates et al. |
| 7,155,321 B2 | 12/2006 | Bromley et al. |
| 7,216,037 B2 | 5/2007 | Graulich et al. |
| 7,257,396 B2 | 8/2007 | Olsen et al. |
| 7,299,125 B2 | 11/2007 | Marks et al. |
| 7,313,467 B2 * | 12/2007 | Breed et al. ................ 701/1 |
| 7,317,975 B2 | 1/2008 | Woolford et al. |
| 7,376,497 B2 * | 5/2008 | Chen ........................ 701/31.6 |
| 7,379,800 B2 * | 5/2008 | Breed ........................ 701/33.7 |
| 7,400,954 B2 | 7/2008 | Sumcad et al. |
| 7,408,453 B2 * | 8/2008 | Breed ........................ 340/442 |
| 7,421,321 B2 * | 9/2008 | Breed et al. ................ 701/33.6 |
| 7,444,210 B2 * | 10/2008 | Breed et al. ................ 701/1 |
| 7,457,693 B2 | 11/2008 | Olsen et al. |
| 7,467,034 B2 * | 12/2008 | Breed et al. ................ 701/29.6 |
| 7,480,551 B1 | 1/2009 | Lowery et al. |
| 7,486,181 B2 | 2/2009 | Olsen et al. |
| 7,527,288 B2 * | 5/2009 | Breed ........................ 280/735 |
| 7,555,370 B2 * | 6/2009 | Breed et al. ................ 701/2 |
| 7,580,782 B2 * | 8/2009 | Breed et al. ................ 701/45 |
| 7,603,894 B2 * | 10/2009 | Breed ........................ 73/146 |
| 7,630,802 B2 * | 12/2009 | Breed ........................ 701/31.6 |
| 7,650,210 B2 * | 1/2010 | Breed ........................ 701/31.9 |
| 7,657,354 B2 * | 2/2010 | Breed et al. ................ 701/45 |
| 7,663,502 B2 * | 2/2010 | Breed ........................ 340/12.25 |
| 7,672,756 B2 * | 3/2010 | Breed ........................ 701/1 |
| 7,693,626 B2 * | 4/2010 | Breed et al. ................ 701/34.4 |
| 7,715,961 B1 * | 5/2010 | Kargupta ................... 701/33 |
| 7,734,390 B2 * | 6/2010 | Chen ........................ 701/31.4 |
| 7,760,080 B2 * | 7/2010 | Breed et al. ................ 340/447 |
| 7,786,864 B1 * | 8/2010 | Shostak et al. ............. 340/572.1 |
| 7,880,594 B2 * | 2/2011 | Breed et al. ................ 340/425.5 |
| 7,889,096 B2 * | 2/2011 | Breed ........................ 340/12.51 |
| 8,036,788 B2 * | 10/2011 | Breed ........................ 701/31.9 |
| 2002/0049535 A1 * | 4/2002 | Rigo et al. .................. 701/211 |
| 2002/0188392 A1 * | 12/2002 | Breed et al. ................ 701/45 |
| 2003/0009270 A1 * | 1/2003 | Breed ........................ 701/29 |
| 2003/0055666 A1 * | 3/2003 | Roddy et al. ............... 705/1 |
| 2003/0065771 A1 * | 4/2003 | Cramer et al. .............. 709/224 |
| 2003/0093199 A1 * | 5/2003 | Mavreas .................... 701/33 |
| 2003/0208309 A1 * | 11/2003 | Triphathi .................... 701/29 |
| 2004/0024502 A1 * | 2/2004 | Squires et al. .............. 701/33 |
| 2004/0039509 A1 * | 2/2004 | Breed ........................ 701/45 |
| 2004/0044452 A1 * | 3/2004 | Bauer et al. ................ 701/33 |
| 2004/0078125 A1 * | 4/2004 | Woodard et al. ........... 701/29 |
| 2004/0130442 A1 * | 7/2004 | Breed et al. ................ 340/443 |
| 2004/0167689 A1 * | 8/2004 | Bromley et al. ............ 701/29 |
| 2004/0215382 A1 * | 10/2004 | Breed et al. ................ 701/45 |
| 2005/0038581 A1 * | 2/2005 | Kapolka et al. ............ 701/29 |
| 2005/0125117 A1 * | 6/2005 | Breed ........................ 701/29 |
| 2005/0192727 A1 * | 9/2005 | Shostak et al. ............. 701/37 |
| 2005/0222723 A1 * | 10/2005 | Estes et al. .................. 701/33 |
| 2005/0273218 A1 * | 12/2005 | Breed et al. ................ 701/2 |
| 2006/0025897 A1 * | 2/2006 | Shostak et al. ............. 701/1 |
| 2006/0031042 A1 * | 2/2006 | Ogura et al. ............... 702/184 |
| 2006/0055564 A1 | 3/2006 | Olsen et al. |
| 2006/0069473 A1 * | 3/2006 | Sumcad et al. ............. 701/29 |
| 2006/0142934 A1 | 6/2006 | Kim |
| 2006/0180371 A1 * | 8/2006 | Breed et al. ................ 180/197 |
| 2006/0212193 A1 * | 9/2006 | Breed ........................ 701/29 |
| 2006/0212194 A1 * | 9/2006 | Breed ........................ 701/29 |
| 2006/0243043 A1 * | 11/2006 | Breed ........................ 73/146 |
| 2006/0244581 A1 * | 11/2006 | Breed et al. ................ 340/447 |
| 2006/0271246 A1 | 11/2006 | Bell et al. |
| 2006/0284839 A1 * | 12/2006 | Breed et al. ................ 345/156 |
| 2007/0005202 A1 * | 1/2007 | Breed ........................ 701/29 |
| 2007/0057781 A1 * | 3/2007 | Breed ........................ 340/457.1 |
| 2007/0075919 A1 * | 4/2007 | Breed ........................ 345/8 |
| 2007/0096565 A1 * | 5/2007 | Breed et al. ................ 307/116 |
| 2007/0103284 A1 * | 5/2007 | Chew et al. ................ 340/438 |
| 2007/0124040 A1 * | 5/2007 | Chen ........................ 701/33 |
| 2007/0126561 A1 * | 6/2007 | Breed ........................ 340/426.13 |
| 2007/0139216 A1 * | 6/2007 | Breed ........................ 340/825.72 |
| 2007/0156312 A1 * | 7/2007 | Breed et al. ................ 701/29 |
| 2007/0173991 A1 * | 7/2007 | Tenzer et al. ............... 701/29 |
| 2007/0174004 A1 | 7/2007 | Tenzer et al. |
| 2007/0205881 A1 * | 9/2007 | Breed ........................ 340/447 |
| 2007/0239346 A1 | 10/2007 | Hawkins |
| 2007/0271014 A1 * | 11/2007 | Breed ........................ 701/29 |
| 2007/0299587 A1 * | 12/2007 | Breed et al. ................ 701/45 |
| 2008/0004764 A1 * | 1/2008 | Chinnadurai et al. ........ 701/29 |
| 2008/0021604 A1 * | 1/2008 | Bouvier et al. ............. 701/30 |
| 2008/0040005 A1 * | 2/2008 | Breed ........................ 701/48 |
| 2008/0042410 A1 * | 2/2008 | Breed et al. ................ 280/735 |
| 2008/0046149 A1 * | 2/2008 | Breed ........................ 701/45 |
| 2008/0065290 A1 * | 3/2008 | Breed et al. ................ 701/29 |
| 2008/0086240 A1 * | 4/2008 | Breed ........................ 701/1 |
| 2008/0114502 A1 * | 5/2008 | Breed et al. ................ 701/2 |
| 2008/0129475 A1 * | 6/2008 | Breed et al. ................ 340/438 |
| 2008/0140278 A1 * | 6/2008 | Breed ........................ 701/29 |
| 2008/0147265 A1 * | 6/2008 | Breed ........................ 701/30 |
| 2008/0147271 A1 * | 6/2008 | Breed ........................ 701/36 |
| 2008/0154458 A1 * | 6/2008 | Brandstetter et al. ........ 701/29 |
| 2008/0161989 A1 * | 7/2008 | Breed ........................ 701/29 |
| 2008/0216567 A1 * | 9/2008 | Breed ........................ 73/146.5 |
| 2008/0284575 A1 * | 11/2008 | Breed ........................ 340/438 |
| 2009/0043441 A1 * | 2/2009 | Breed ........................ 701/29 |
| 2009/0051566 A1 | 2/2009 | Olsen et al. |

(56) References Cited

U.S. PATENT DOCUMENTS

| | | | |
|---|---|---|---|
| 2009/0055045 | A1 | 2/2009 | Biswas et al. |
| 2009/0102638 | A1 | 4/2009 | Olsen et al. |
| 2009/0259358 | A1 | 10/2009 | Andreasen |
| 2010/0023203 | A1 | 1/2010 | Shibi |
| 2010/0138701 | A1 | 6/2010 | Costantino |
| 2010/0174446 | A1 | 7/2010 | Andreasen et al. |
| 2010/0207754 | A1* | 8/2010 | Shostak et al. ............... 340/450 |
| 2011/0118932 | A1 | 5/2011 | Singh et al. |
| 2012/0136743 | A1 | 5/2012 | McQuade et al. |

OTHER PUBLICATIONS

International Searching Authority, International Search Report and Written Opinion for International Application No. PCT/US2012/048401, mailed Oct. 5, 2012, 11 pages, European Patent Office, The Netherlands.

United States Patent and Trademark Office, Office Action for U.S. Appl. No. 13/558,425, dated Dec. 7, 2012, 14 pages, USA.

Ciulla, Vincent T., "Auto Repair: Flash Codes," About.com, undated, 1 page, <http://autorepair.about.com/library/glossary/bldef-228.htm>, retrieved on Jun. 27, 2011.

Author Unknown, "On-Board Diagnostics," *Wikipedia*, undated, 10 pages, <http://en.wikipedia.org/wiki/On-board_diagnostics>, retrieved on Jun. 24, 2011.

Author Unknown, "SAE International," *Wikipedia*, undated, 5 pages, <http://en.wikipedia.org/wiki/SAE_International>, retrieved on Jun. 24, 2011.

Author Unknown, "SAE J 1857-2003 (SAE J1857-2003) Flywheel Dimensions for Truck and Bus Applications," *American National Standards Institute, Standards Store*, undated, 1 page, <http://webstore.ansi.org/RecordDetail.aspx?sku=SAE+J+1857-2003+(SAE+J1857-2003)>, retrieved on Jun. 24, 2011.

Author Unknown, "Telematics," *Wikipedia*, undated, 6 pages, <http://en.wikipedia.org/wiki/Telematics>, retrieved on Jun. 28, 2011.

Simma Software, "J1587 Protocol Stack Overview," Mar. 2, 2008 to Apr. 19, 2009, Internet Archive <web.archive.org/web/20090419231206/http://www.simmasoftware.com/j1587.html>, 1 page.

United States Patent and Trademark Office, Office Action for U.S. Appl. No. 13/558,425, Feb. 15, 2013, 20 pages, USA.

International Preliminary Examining Authority, Second Written Opinion for International Application No. PCT/US2012/048401, mailed Aug. 1, 2013, 7 pages, European Patent Office, The Netherlands.

* cited by examiner

VEHICLE MAINTENANCE SYSTEMS AND METHODS

CROSS-REFERENCE TO RELATED APPLICATIONS

This application claims the benefit of U.S. Provisional Patent Application Ser. No. 61/043,124, filed Apr. 7, 2008, which is hereby incorporated herein in its entirety by reference.

BACKGROUND OF THE INVENTION

1. Field of the Invention

This application relates to a system and a method for predicting when a vehicle is going to experience a fault and repairing and/or maintaining the vehicle in response to the fault prediction. These systems and methods are applicable to any organization that maintains a fleet of vehicles or a group of similar machines or instrumentalities.

2. Description of Related Art

Maintenance and repair of a vehicle is a general concern to an owner or operator of a vehicle. Cost of labor and components, downtime, productivity, performance, and efficiency, among other factors, all impact the ability of a vehicle to perform as it is designed. Accordingly, maintenance systems have arisen in an attempt to reign in vehicle maintenance costs, reduce downtime, and increase productivity.

Some maintenance systems have been premised on performing routine maintenance at predetermined mileage intervals or periodic time intervals. Still others provide warning alerts when a part on a vehicle has broken down. However, a typical problem with conventional maintenance systems is that they have generally been reactive in nature and have not generally not taken into account the actual causes, reasons, or indications of specific breakdowns and faults in vehicles. Maintenance has usually not been performed on a vehicle until the vehicle is broken down, resulting in excessive downtime of the vehicle and, potentially, additional costs and repairs that were caused because of the breakdown.

Accordingly, there is a need in the art for systems and methods for identifying when vehicles are going to breakdown or experience faults and proactively maintaining and repairing the vehicles before the breakdowns and faults occur.

BRIEF SUMMARY OF THE INVENTION

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

Embodiments of the present invention provide an improvement over known maintenance systems by, among other things, providing a vehicle maintenance system that is configured to provide one or more of the following advantages: (1) reduce the number of vehicle breakdowns, (2) reduce maintenance and repair costs, (3) reduce vehicle downtime for maintenance and repairs, (4) increase vehicle efficiency and performance, and (5) increase vehicle lifetime.

In various embodiments of the present invention, a preventative vehicle maintenance system is provided. The system includes a fleet of vehicles comprising a plurality of vehicles, an electronic control module (ECM) disposed in each of the plurality of vehicles within the fleet of vehicles, a computer processor adapted to execute a vehicle maintenance engine, and a memory coupled to the computer processor and adapted for storing the vehicle maintenance engine. Each of the ECMs is configured to collect data from one or more sensors disposed within the respective vehicle in which the ECM is disposed. The vehicle maintenance engine is configured for receiving from the sensor signal data collected from the one or more sensors disposed within the respective plurality of vehicles, statistically analyzing data received from at least one type of sensor of the one or more sensors disposed within the plurality of vehicles to identify at least one earmark corresponding to a potential fault condition for one or more vehicle components associated with the at least one type of sensor, and individually comparing the sensor signal data from the at least one type of sensor received from each of the plurality of vehicles to the identified earmark. If the received sensor signal data from the at least one type of sensor for a particular one of the plurality of vehicles is within a particular range of the earmark, the vehicle maintenance engine is configured for generating an alert code for the particular vehicle. In response to generating the alert code, the vehicle maintenance engine is configured for repairing the one or more vehicle components for the particular vehicle to prevent the occurrence of a failure of the one or more vehicle components in advance.

In other various embodiments, a method for maintaining a vehicle is provided. The method begins with the step of receiving from a plurality of ECMs sensor signal data collected from a first type of sensor disposed within each of a plurality of vehicles, in which each ECM is disposed within a respective one of the plurality of vehicles. The method continues by determining a first statistical distribution of the sensor signal data from substantially all of the plurality of vehicles, determining a second statistical distribution for each of the plurality of vehicles of the sensor signal data from the first type of sensor from each of the plurality of vehicles, and statistically comparing each second statistical distribution for each of the plurality of vehicles to the first statistical distribution related to substantially all of the plurality of vehicles to determine a degree of difference between the statistical distributions. In response to the degree of difference being outside of a predetermined range based on the first statistical distribution for substantially all of the plurality of vehicles, the method generates an alert code for the particular vehicle. In response to generating the alert code, the method includes the step of repairing one or more vehicle components for the particular vehicle associated with the first type of sensor data to prevent the occurrence of a failure of the one or more vehicle components in advance.

In yet another embodiment, another method for maintaining a vehicle is provided. The method includes the steps of receiving from an ECM a first set of sensor signal data collected from one or more sensors disposed within a vehicle, the first set of sensor signal data being collected during a first time period, and receiving from the ECM a second set of sensor signal data collected from the one or more sensors disposed within the vehicle, the second set of sensor signal data being collected during a second time period. Next, the method continues by determining a statistical distribution of at least a portion of the first set of sensor signal data associated with a particular type of sensor, determining an average of at least a portion of the second set of sensor signal data associated with the particular type of sensor, and statistically comparing the average to the statistical distribution to determine a degree of difference between the average and the statistical distribution. In response to the degree of difference being outside of a predetermined range based on the statistical distribution of at least a portion of the first set of sensor signal data associated with the particular type of sensor, the method generates an alert code for the vehicle. In response to generating the alert code, the method includes the step of repairing one or more vehicle components for the vehicle associated with the first type of sensor data to prevent the occurrence of a failure of the one or more vehicle components in advance.

In another embodiment, another method for maintaining a vehicle is provided. The method begins with the step of receiving a first set of sensor signal data collected by a plurality of electronic control modules (ECM) during a first period of time. Each ECM is disposed within a respective vehicle of a plurality of vehicles, and the sensor signal data collected by each ECM is collected from one or more sensors disposed within the respective vehicle in which the respective ECM is disposed. The method continues with the steps of statistically analyzing at least a portion of the first set of sensor signal data collected from at least one type of sensor of the one or more sensors to identify at least one earmark corresponding to a potential fault condition for one or more vehicle components associated with the at least one type of sensor, receiving sensor signal data collected by the plurality of ECMs during a second period of time, and individually comparing at least a portion of the sensor signal data collected from the at least one type of sensor from each of the plurality of vehicles to the identified earmark. In response to the least a portion of the sensor signal data from a particular vehicle of the plurality of vehicles being within a particular range of the earmark, an alert code is generated for the particular vehicle. In response to generating the alert code, the method includes the step of repairing the one or more vehicle components for the particular vehicle to prevent the occurrence of a failure of the one or more vehicle components in advance of the failure of the one or more components.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview

Various embodiments of the invention generally relate to systems and methods related to the maintenance of vehicles. In certain embodiments, historical data measurements from at least one vehicle in a fleet of vehicles are analyzed to identify the underlying reasons for vehicle faults and breakdowns and to develop algorithms that identify conditions that tend to indicate when a vehicle may be about to experience a fault. In particular, to predict vehicle faults, a plurality of vehicles in a fleet are each equipped with a data collection device, such as an electronic control module ("ECM"), that is configured to collect data from various signal sensors disposed on the vehicle, such as, for example, oil pressure, coolant temperature, and battery voltage, among others, and transmit the collected data to a vehicle maintenance server. In certain embodiments, the data is collected over a period of time and statistically analyzed to identify earmarks that are predictive of one or more upcoming vehicle faults based on vehicle maintenance histories. Once these data earmarks are identified, these earmarks are compared to the data collected from each of the plurality of vehicles to determine whether an earmark has been reached for each vehicle. In response to the ECM data matching or being within a particular range of a particular earmark, an alert code is generated and the repair of the one or more components related to the upcoming vehicle fault is coordinated to prevent the occurrence of a failure of the one or more vehicle components in advance. In one embodiment, the driver is notified of the potential fault. Furthermore, in various embodiments, the ECM is instructed to obtain more frequent measurements from one or more sensors related to the earmark if the data measured is matches or is within the particular range of the particular earmark. In other various embodiments, a maintenance visit is scheduled, and the driver is notified that maintenance is required on the vehicle. Additionally, in one embodiment, a part needed for repair is automatically requested or ordered if, for example, the part is not stocked or readily available.

System Overview

Figure 1:
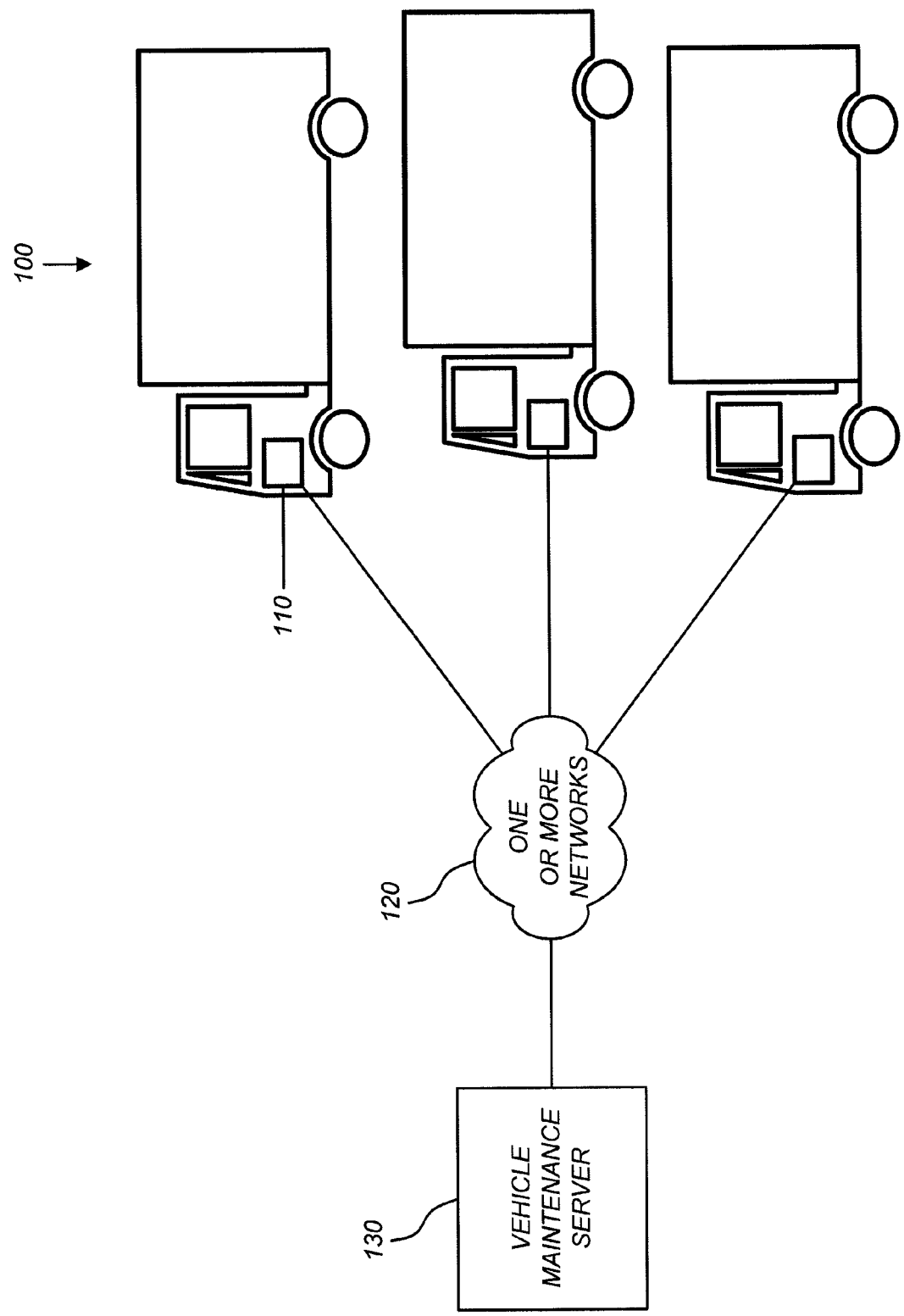
FIG. 1 is an overview of the relationships of the components of a vehicle maintenance system, according to an embodiment of the present invention.

In various embodiments, according to FIG. 1, a fleet maintenance system includes a fleet of vehicles 100, an ECM 110 disposed within each of at least a plurality of the vehicles in the fleet for which the fleet operator wishes to record data, and a vehicle maintenance server 130 that is configured to receive data from each ECM 110. In particular embodiments, the ECM 110 is a data collection device that is disposed in a particular vehicle and is adapted to receive (e.g., on a substantially continuous basis) data measurements from various sensors in the vehicle. For example, according to various embodiments, the sensors include, but are not limited to, sensors adapted for measuring oil pressure, coolant temperature, coolant pressure, coolant level, voltage, oil temperature, road speed in miles-per-hour (MPH), engine speed in revolutions-per-minute (RPM), throttle position, accelerator pedal position, warning lights, engine load, oil level, boost pressure, injection control pressure (ICP), ICP desired, ICP duty cycle, fuel pulsewidth, average miles per gallon, idle hours, idle fuel, total mileage, total engine hours, total fuel, ABS control status, park brake status, air intake temperature, cycle counts of the starter, cycle counts of the ignition switch, alternator sensor, fuel injector sensor, and/or EGR valve temperature. In certain embodiments, suitable ECMs 110 include commercially available products that are programmed to record certain measurements at pre-determined times. For example, in a particular embodiment, the ECM 110 is instructed to record the oil pressure when the engine speed is within a certain range and the coolant temperature is above a certain level. As another example, the ECM 110 is instructed to take the oil pressure reading at certain predetermined intervals. Thus, according to various embodiments, the ECM 110 is instructed to record virtually endless permutations and combinations of data measurements from the various sensors on a vehicle.

According to various embodiments, the data measurements taken by the ECM 110 are then transmitted to another device, such as a vehicle maintenance server 130 that is configured to receive the data from at least a portion of the ECMs 110 in the fleet. The ECM 110 transmits data to the vehicle maintenance server 130 via one or more networks 120. According to various embodiments, the ECM 110 transmits the data via a wireless network (e.g., a wireless wide area network (WWAN), a wireless local area network (WLAN), or a wireless personal area network (WPAN) or through a wired connection to the vehicle maintenance server 130. For example, in one embodiment in which the ECM 110 transmits data via a WWAN, the ECM 110 is equipped with a cellular data radio that is configured to communicate with the vehicle maintenance server 130 over a cellular communications network. In another (or a further) embodiment in which the ECM 110 is configured to transmit data via a WLAN, the ECM 110 is equipped with a WLAN data radio capable of communicating with the vehicle maintenance server 130 via a WLAN protocol (e.g., 802.11b protocol)

In various embodiments, the vehicle maintenance 130 is any type of computer, including a server, mainframe, desktop, laptop, computer workstation/terminal, handheld computer, or other similar device. The vehicle maintenance server 130 may be one device or it may comprise multiple devices. Additionally, the vehicle maintenance server 130 is configured to receive data from either all or fewer than all of the ECMs 110 and is configured to receive either all or less than all of the data from each ECM 110 from which it receives data. In various embodiments, the vehicle maintenance server 130 may be external to the ECM 110, external to a vehicle that contains the ECM 110, internal to a vehicle that contains the ECM 110, combined with the ECM 110, or any combination thereof. In some embodiments, the vehicle maintenance server 130 stores the data received from the ECMs 110 in a relational database management system, such as SQL Server, Oracle, Access, or other database management system.

Figure 2:
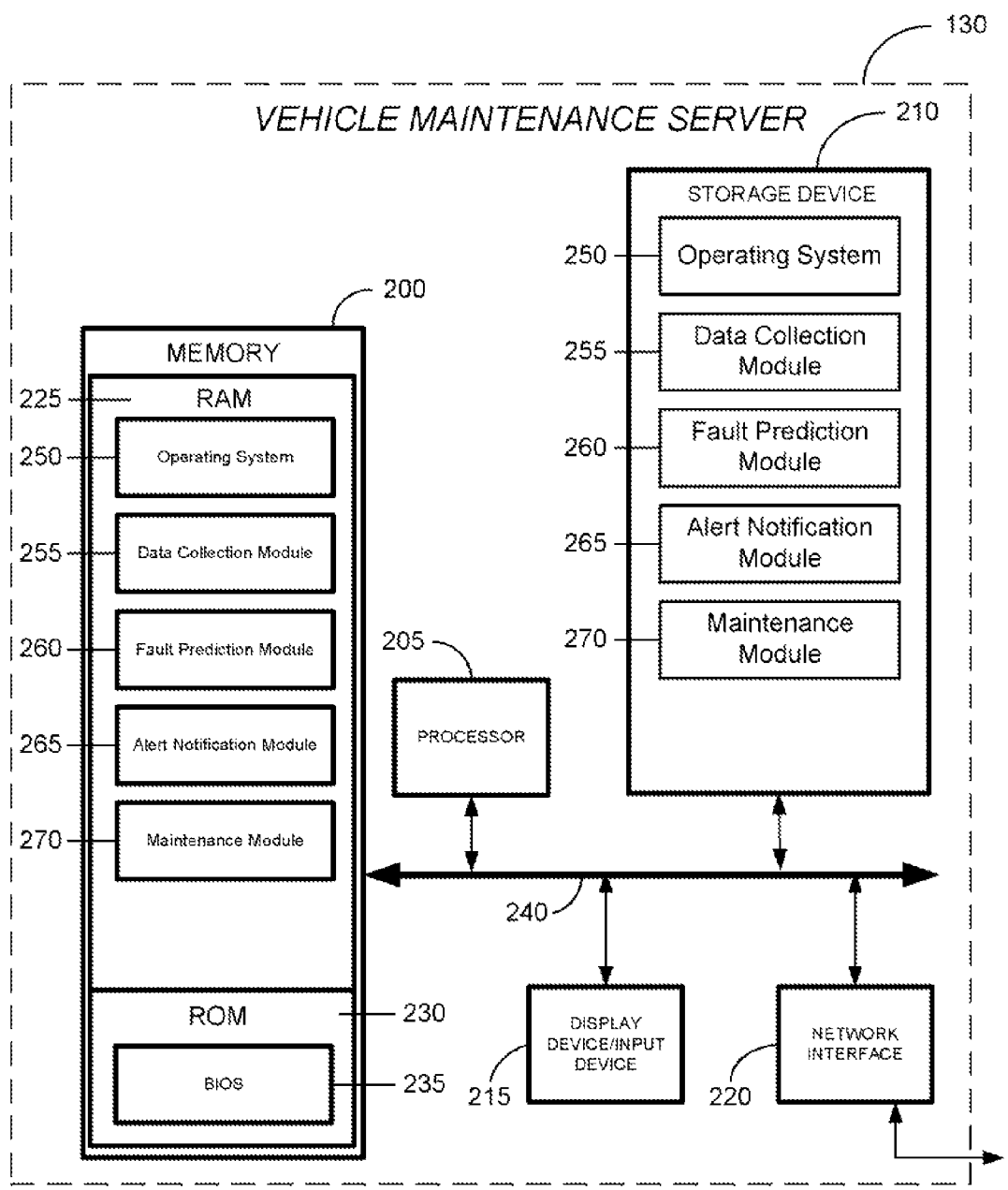
FIG. 2 is schematic block diagram of a Vehicle Maintenance Server that incorporates an embodiment of the present invention.

FIG. 2 shows a schematic diagram of a vehicle maintenance server 130 according to one embodiment of the invention. As may be understood from this figure, in this embodiment, the vehicle maintenance server 130 includes a processor 205 that communicates with other elements within the vehicle maintenance server 130 via a system interface or bus 240. Also included in the vehicle maintenance server 130 is a display device/input device 215 for receiving and displaying data. This display device/input device 215 may be, for example, a keyboard or pointing device that is used in combination with a monitor. The vehicle maintenance server 130 further includes memory 200, which preferably includes both read only memory (ROM) 230 and random access memory (RAM) 225. The server's ROM 230 is used to store a basic input/output system 235 (BIOS), containing the basic routines that help to transfer information across the one or more networks 120.

In addition, the vehicle maintenance server 130 includes at least one storage device 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 is connected to the system bus 240 by an appropriate interface. The storage devices 210 and their associated computer-readable media provide non-volatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules are stored by the various storage devices and within RAM 225. According to various embodiments, such program modules include an operating system 250, a Data Collection Module 255, a Fault Prediction Module 260, an Alert Notification Module 265, and a Maintenance Module 270. The Data Collection Module 255, Fault Prediction Module 260, Alert Notification Module 265, and Maintenance Module 270 control certain aspects of the operation of the vehicle maintenance server 130, with the assistance of the processor 205 and an operating system 250.

Also located within the vehicle maintenance server 130 is a network interface 220 for interfacing and communicating with other elements of a computer network. It will be appreciated by one of ordinary skill in the art that one or more of the vehicle maintenance server 130 components may be located geographically remotely from other vehicle maintenance server 130 components. Furthermore, one or more of the components may be combined, and additional components performing functions described herein may be included in the vehicle maintenance server 130.

Figure 3:
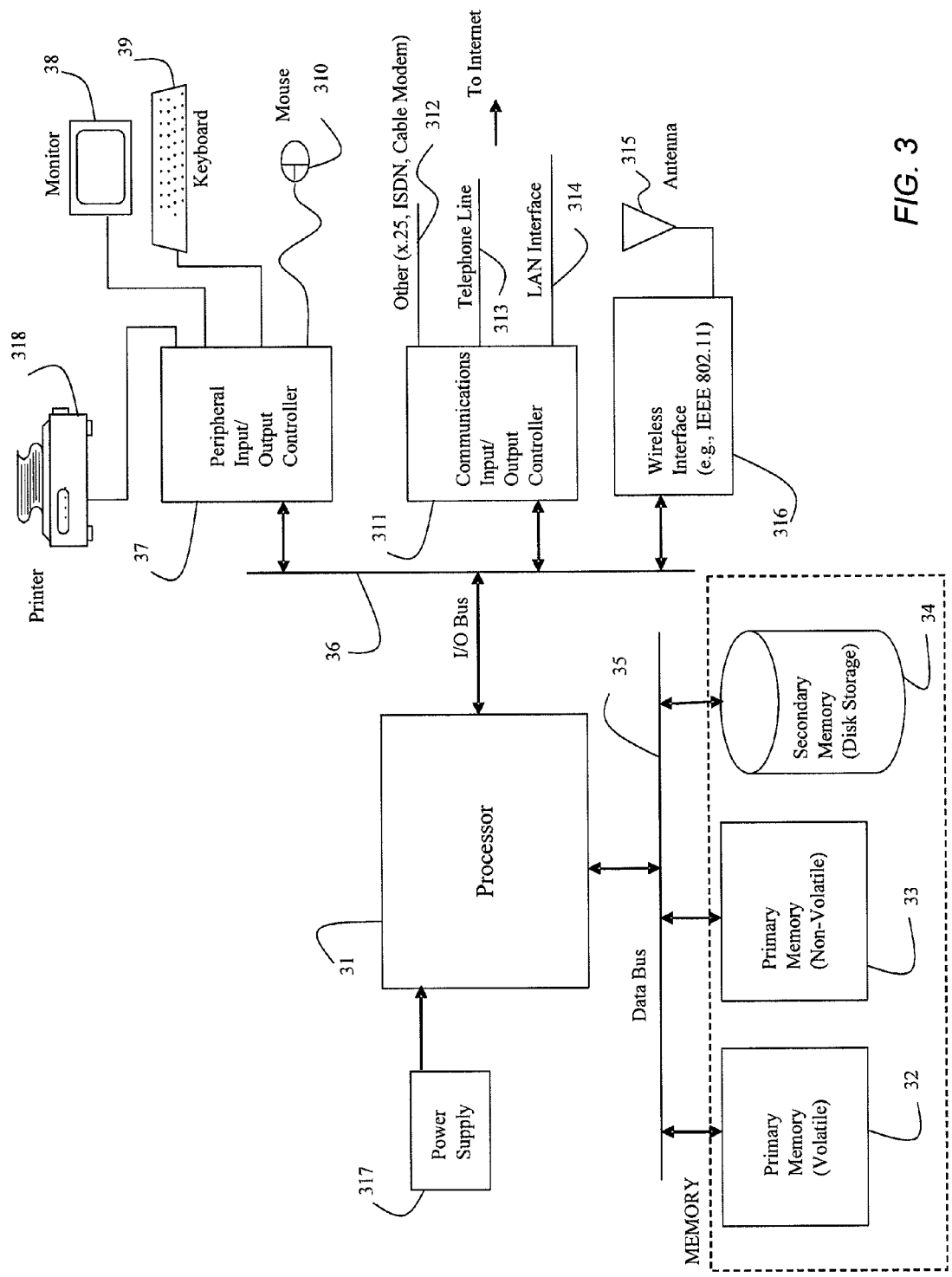
FIGS. 3 and 4 show examples of computer devices that can be used to implement various embodiments of the present invention.

Some method steps performed in various embodiments of the invention are completed by updating computer memories or transferring information from one computer memory to another. Other examples of computer components that are used to implement various embodiments of the invention (for example, the modules of FIG. 2) are described in connection with FIGS. 3 and 4. In particular, turning to FIG. 3, an embodiment of a computer is illustrated that can be used to practice various aspects of the embodiments of present invention, such as the various computer systems described herein. In FIG. 3, a processor 31, such as a microprocessor, is used to execute software instructions for carrying out the defined steps. The processor receives power from a power supply 317 that also provides power to the other components as necessary. The processor 31 communicates using a data bus 35 that is typically 16 or 32 bits wide (e.g., in parallel). The data bus 35 is used to convey data and program instructions, typically, between the processor and memory. In various embodiments, memory can be considered volatile primary memory 32, such as RAM or other forms which retain the contents only during operation, or it can be non-volatile primary memory 33, such as ROM, EPROM, EEPROM, FLASH, or other types of memory that retain the memory contents at all times. The memory could also be secondary memory 34, such as disk storage, that stores large amount of data. In some embodiments, the disk storage communicates with the processor using an I/O bus 36 or a dedicated bus (not shown). The secondary memory is a floppy disk, hard disk, compact disk, DVD, or any other type of mass storage type known to those skilled in the computer arts. One of ordinary skill will recognize that as data is transferred between two or more computing devices (in accordance with the below-described processing steps), the data is read from and written to one or more of these memory areas and the memory area is physically changed as a result of the process.

The processor 31 also communicates with various peripherals or external devices using the I/O bus 36. In the present embodiment, a peripheral I/O controller 37 is used to provide standard interfaces, such as RS-232, RS422, DIN, USB, or other interfaces as appropriate to interface various input/output devices. Typical input/output devices include local printers 318, a monitor 38, a keyboard 39, and a mouse 310 or other typical pointing devices (e.g., rollerball, trackpad, joystick, etc.).

According to various embodiments of the invention, the processor 31 typically also communicates with external communication networks using a communications I/O controller 311, and may use a variety of interfaces such as data communication oriented protocols 312 such as X.25, ISDN, DSL, cable modems, etc. The communications I/O controller 311 may also incorporate a modem (not shown) for interfacing and communicating with a standard telephone line 313. Additionally, the communications I/O controller may incorporate an Ethernet interface 314 for communicating over a LAN. Any of these interfaces may be used to access the Internet, intranets, LANs, or other data communication facilities.

Also, the processor 31 may communicate with a wireless interface 316 that is operatively connected to an antenna 315 for communicating wirelessly with other devices, using for example, one of the IEEE 802.11 protocols, 802.15.4 protocol, or a standard 3G wireless telecommunications protocol, such as CDMA2000 1x EV-DO, GPRS, W-CDMA, or other protocol.

Figure 4:
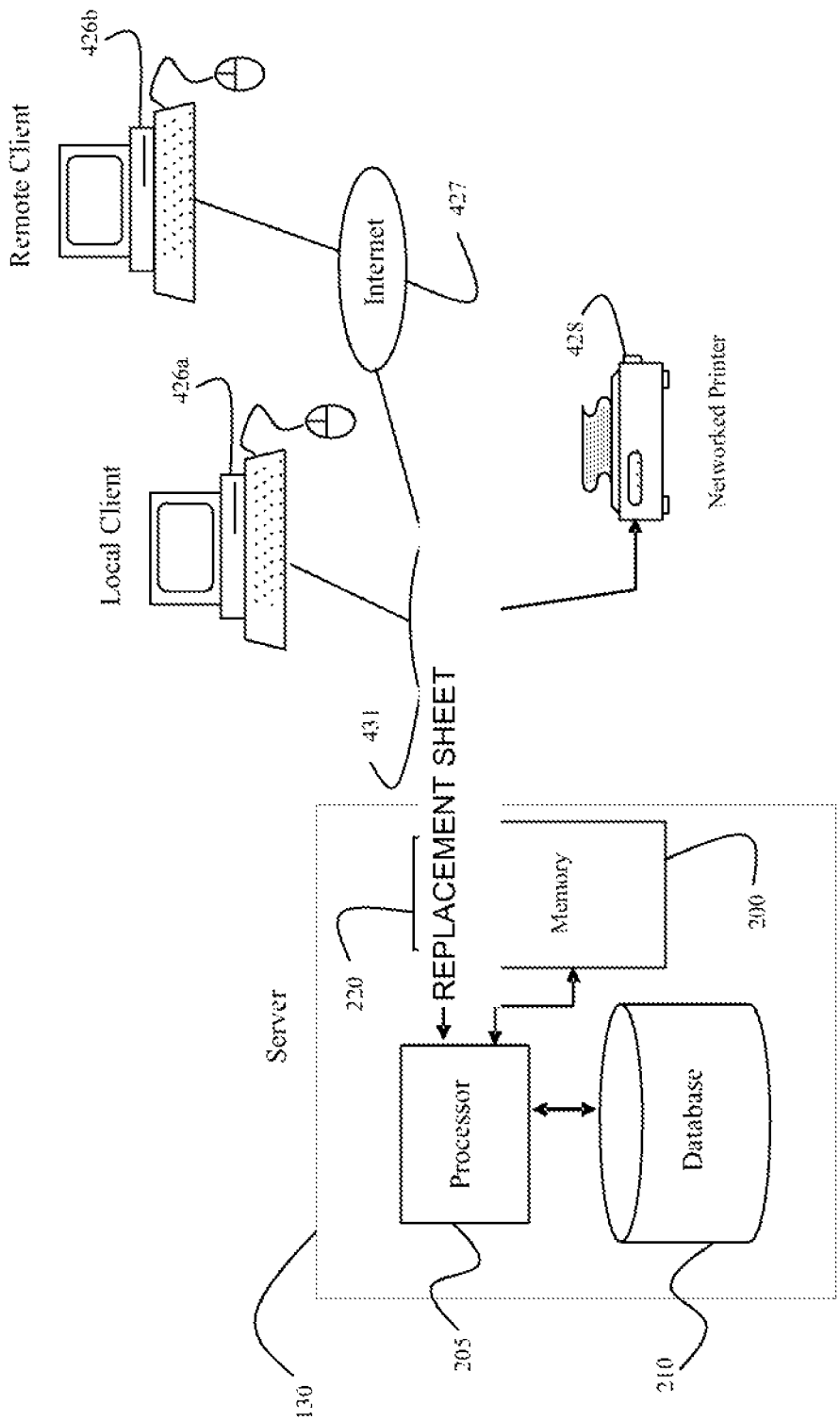

A further alternative embodiment of a processing system that may be used is shown in FIG. 4. In this embodiment, a distributed communication and processing architecture is shown involving, for example, the scheduled delivery service server 130 communicating with either a local client computer 426a or a remote client computer 426b. The server 130 typically comprises a processor 205 that communicates with a database 210, which can be viewed as a form of secondary memory, as well as primary memory 200. The processor also communicates with external devices using an I/O controller 220 that typically interfaces with a local area network (LAN) 431. The LAN provides local connectivity to a networked printer 428 and the local client computer 426a. These may be located in the same facility as the server, though not necessarily in the same room. Communication with remote devices typically is accomplished by routing data from the LAN 431 over a communications facility to the Internet 427. A remote client computer 426b executes a web browser, so that the remote client 426b may interact with the server 130 as required by transmitted data through the Internet 427, over the LAN 431, and to the server 130. The one or more networks 120 in FIG. 1 may be the Internet 427. References made herein to a network are meant to include one or more networks configured to carry out the function or feature being described.

Those skilled in the art of data networking will realize that many other alternatives and architectures are possible and can be used to practice the principles of the present invention. The embodiments illustrated in FIGS. 3 and 4 can be modified in different ways and be within the scope of the present invention as claimed. It should be understood that many individual steps of a process according to the present invention may or may not be carried out utilizing the computer systems described, and that the degree of computer implementation may vary.

Figure 5:
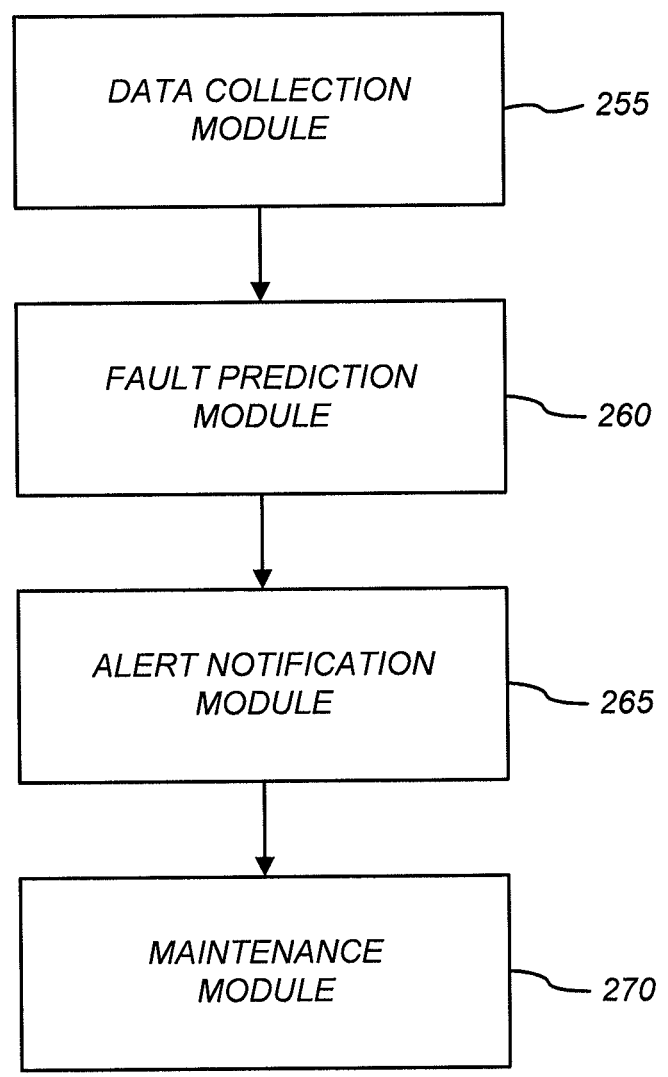
FIG. 5 depicts an overview of the process flow between the modules of the vehicle maintenance system, according to an embodiment of the present invention.

Furthermore, as depicted in FIG. 2 and additionally depicted in FIG. 5, according to various embodiments, aspects of the operation of the vehicle maintenance server 130 are controlled by certain program modules, with the assistance of the processor 205 and an operating system 250. These modules include the Data Collection Module 255, Fault Prediction Module 260, Alert Notification Module 265, and Maintenance Module 270. FIG. 5 depicts an overview of the relationship of the operations and/or activities performed by these modules. The Data Collection Module 255 (Block 255) is configured to instruct the ECMs 110 to collect data from one or more sensors in a vehicle, and in certain embodiments, the ECMs 110 are programmed to collect data at particular time intervals, at particular mileage intervals, or in other specific manners. The Data Collection Module 255 receives all data from the ECM 110, stores the data, and transmits the data to the Fault Prediction Module 260 (Block 260). The Fault Prediction Module 260 is configured to receive data from the Data Collection Module 255 and determine whether the data is predictive of a potential fault in a vehicle and to provide and detected faults to the Alert Notification Module 265 (Block 265). The Alert Notification Module 265 is configured to generate an alert code, assign a level of priority to the alert, and provide the alert to both the vehicle driver and the Maintenance Module 270 (Block 270). The Maintenance Module 270 is configured to automatically check the components inventory for components required to perform a repair based on the alert code, automatically order any components required that are not currently in the inventory, automatically coordinate a repair based on the alert code, automatically notify the vehicle driver of the repair visit, and/or automatically dispatch the components required for the repair visit.

Data Collection

Figure 6:
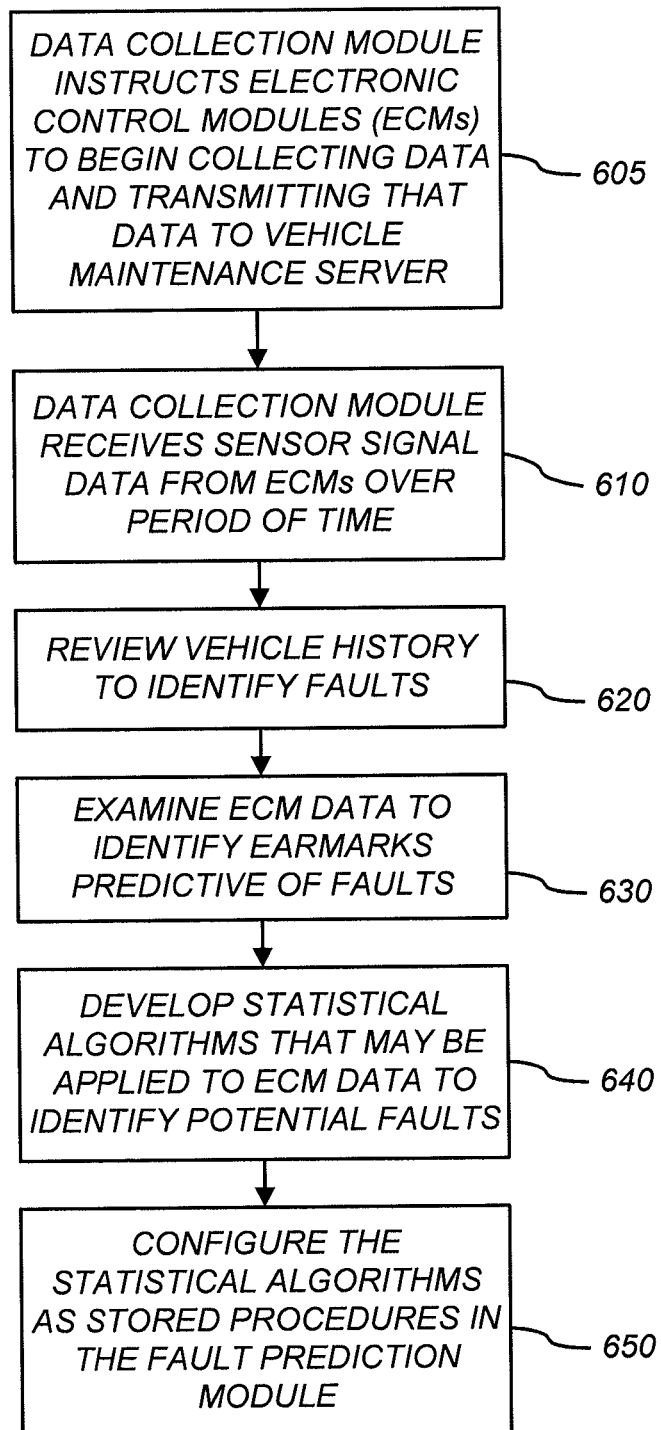
FIGS. 6 through 7 depict the steps of a method performed by the Data Collection Module and Fault Prediction Module, according to an embodiment of the invention.

As depicted in the embodiment shown in FIG. 6, the Data Collection Module 255 instructs the ECMs 110 to begin collecting data and transmitting that data to the vehicle maintenance server 130 as shown in Step 605. According to various embodiments, the Data Collection Module 255 instructs the ECMs 110 to record data measurements from certain sensors, at certain periods of time, when certain criteria have been satisfied, or any combination thereof. In addition, the Data Collection Module 255 receives sensor signal data from the ECMs 110 over a period of time (e.g., a moderate duration, such as 3 months, 6 months, 1 year, or a shorter or longer duration), shown as Step 610. The period of time of collection, according to various embodiments, depends on the length deemed necessary or desirable by the fleet operator to collect a representative amount of data about the fleet vehicles. The gathered data, according to a particular embodiment, facilitates the prediction and/or diagnosis of faults and breakdowns in the fleet vehicles.

According to various embodiments, data collected by the ECM 110 and transmitted to the Data Collection Module 255 includes, for example, data from sensors in communication with various components of an engine or vehicle. For example, the sensors collect various types of data, including but not limited to, oil pressure, coolant temperature, coolant pressure, coolant level, voltage, oil temperature, road speed in miles-per-hour (MPH), engine speed in revolutions-per-minute (RPM), throttle position, accelerator pedal position, warning lights, engine load, oil level, boost pressure, injection control pressure (ICP), ICP desired, ICP duty cycle, fuel pulsewidth, average miles per gallon, idle hours, idle fuel, total mileage, total engine hours, total fuel, ABS control status, park brake status, air intake temperature, cycle counts of the starter, cycle counts of the ignition switch, alternator sensor, fuel injector sensor, and/or EGR valve temperature.

For example, according to particular embodiments, with respect to collecting data to identify when an oil change is needed for a particular vehicle, samples of oil from at least a plurality of engines in vehicles having an ECM 110 disposed therein (or samples of oil from a representative segment of engines in vehicles having ECMs 110 disposed therein) are extracted and analyzed at periodic intervals. The results of the analysis identify the levels of contaminants in the oil samples, as well as the kinematic viscosity of each sample. At similar or nearby times to when the oil samples are taken from at least a plurality of engines, the Data Collection Module 255 instructs each corresponding ECM 110 to record measurements from various sensors on the engine and on the vehicle, including the oil pressure. The data gathered by the ECM 110 is stored in the Data Collection Module 255 (or in an associated data storage device) along with data indicative of the type of engine, the model year of the engine, the type of transmission, the geographic region where the vehicle is operated, and/or any other relevant factors, and the data obtained from the oil sampling and analysis is stored as vehicle history along with the maintenance and repair history of the respective vehicles.

In other various embodiments (not shown in FIG. 6), the ECM is programmed to collect data measurement from certain sensors on its own, without instruction from the Data Collection Module 255.

Data Mining to Identify Data that is Predictive of Pre-Determined Faults

In various embodiments, once data measurements have been collected by the ECMs 110 and transmitted to and stored by the Data Collection Module 255 for a particular time period (e.g., 3 months, 6 months, 1 year, shorter, or longer), the data is statistically analyzed to identify the underlying reason(s) for any vehicle faults that occurred with the vehicles sampled. In particular, to identify the reason(s) that is predictive of vehicle faults, the vehicle histories for a plurality of vehicles in the fleet of vehicles are first reviewed to identify vehicle faults that have already occurred as shown in Step 620. Vehicle history is related to various components of a vehicle, including the oil, the battery, the starter, the alternator, the ignition switch, the EGR valve, temperature sensors, the cooling system, ABS, fuel injectors, injection control pressure sensors, fuel filters, the fuel pump, the transmission, the engine, the throttle, the park brake, the accelerator pedal, wheel bearings, wheel sensors, wheel seals, hoses, and other components of a vehicle. Vehicle history includes, for example, various types of information about a vehicle, including its maintenance history, its history of breakdowns and faults, and operational data related to the various vehicle components (e.g., results of testing and analysis of oil samples), among other types of information. In one embodiment, faults are identified by reviewing any of the types of vehicle history related to the various components of a vehicle.

For example, in regard to the results of analysis of oil samples, various faults related to oil may be identified by analyzing the oil samples for the presence of contaminants and/or to determine the kinematic viscosity of the oil. In particular, in one embodiment, the results identify contaminants and metals, including, for example, antifreeze, fuel dilution, oxidation, aluminum, chromium, lead, water, and excess soot, among other contaminants and metals. Furthermore, the kinematic viscosities of the oil samples may correspond to the levels and types of contamination in the oil samples. In particular, for each different weight of oil, there are industry accepted levels of acceptable operating ranges for kinematic viscosity. Thus, for kinematic viscosities that are outside of the acceptable operating ranges, the related levels of contamination of antifreeze, fuel dilution, oxidation, aluminum, chromium, lead, water, and excess soot, among other contaminants and metals, are identified as faults.

In regard to other components of the vehicles, faults that can be identified from reviewing the vehicle history include, for example, dead or dying batteries, dead or dying starters, dead or dying alternators, dead or dying ignition switches, failed or failing fuel filters, failed or failing temperature sensors, cooling system problems, failed or failing wheel sensors, failed or failing wheel bearings, failed or failing wheel seals, failed or failing fuel injectors, leaking hoses, failed or failing injection control pressure sensors, incorrect park brake setting, and failed or failing accelerator pedal assemblies, among other types of faults and breakdowns.

According to various other embodiments, other types of faults are identifiable in relation to any type, model, brand, and/or design of vehicle, engine, or other vehicle component.

Once faults are identified, the data recorded by the ECMs 110 is then examined to identify one or more earmarks that are predictive of the faults as shown in Step 630. For example, as noted above, various earmarks are predictive of the faults related to contaminated oil or oil that otherwise needed to be replaced. In particular, for oil contaminated with antifreeze, water, and excess soot, the predictive earmark is an increase in oil pressure above an acceptable oil pressure, and for oil diluted with fuel or oxidized oil, the predictive earmark is a decrease in oil pressure below an acceptable oil pressure.

As another example, multiple earmarks may indicate a fault of a dead or dying battery, including, but not limited to, a battery voltage that is lower than an acceptable battery voltage, a battery voltage at startup that is lower than an acceptable battery voltage at startup, a battery voltage at resting state that is lower than an acceptable battery voltage at resting state, an ECM 110 fault with a signal sensor, an ECM 110 fault with a signal sensor problem following the replacement of the signal sensor, a battery voltage that is lower than an acceptable battery voltage in combination with an alternator sensor warning, a battery voltage that is lower than an acceptable battery voltage in combination with the number of cycle counts of the starter exceeding a certain number of starts, and/or an air intake temperature that is lower than an acceptable air intake temperature.

Furthermore, in regard to the fault of a dead or dying starter, various earmarks include, for example, the number of cycle counts of the starter exceeding a certain number of starts, a battery voltage that is lower than an acceptable battery voltage in combination with the number of cycle counts of the starter exceeding a certain number of starts, and/or a battery voltage at startup that is lower than an acceptable battery voltage at startup.

For the fault of a dead or dying alternator, predictive earmarks include, for example, a battery voltage at startup that is lower than an acceptable battery voltage at startup and/or an alternator fault from the ECM 110 in combination with a failed electrical test. In addition, in regard to a dead or dying ignition switch, an earmark includes, for example, the number of cycle counts of the ignition switch exceeding a certain number of starts.

Many other faults are predicted by various earmarks identified by the ECM 110. In regard to the fuel filter, a failed or failing fuel filter is predicted, for example, by the earmark of a fuel injector sensor warning. A failed or failing coolant temperature sensor is predicted, for example, by a low coolant temperature in relation to a high EGR valve temperature. A coolant system problem is indicated, for example, by a high coolant temperature in relation to a high EGR valve temperature. An ABS fault code from the ECM 110 is a predictive earmark of various faults, including a failed or failing wheel sensor, a wheel bearing problem, a wheel seal problem, and a failed overdrive gear, for example. Additionally, a the fault of a failed or failing fuel injector is indicated by various earmarks, including, for example, an injection control pressure that is higher than an acceptable injection control pressure, an injection control pressure that varies more than an acceptable variance, and/or an injection control pressure sensor fault code from the ECM 110 in combination with a coolant temperature that has decreased below an acceptable coolant temperature. Even more, a leaking hose is predicted, for example, by a decrease in oil pressure below an acceptable oil pressure in combination with a coolant temperature that has increased above an acceptable coolant temperature and/or a coolant pressure that has decreased below an acceptable coolant pressure in combination with a coolant temperature that has increased above an acceptable coolant temperature. Furthermore, in regard to the injector control pressure sensor, the earmark of a number of miles exceeding a certain number of miles is indicative, for example, of a failed or failing injection control pressure sensor. For the fault of an incorrectly set park brake, an earmark of this fault includes, for example, an indication that the park brake is set when the engine is not at a resting state and/or an indication that the park brake is not set when the engine is at a resting state. Additionally, the fault of a failed park brake assembly is predicted the earmark of an accelerator sensor alarm, for example.

According to various other embodiments, other types of correlations between vehicle faults and the predictive earmarks of the vehicle faults are identifiable in relation to any type, model, brand, and/or design of vehicle, engine, or other vehicle component.

According to various embodiments, each of the predictive earmarks falls into one or more categories of earmarks, including threshold values and acceptable operating ranges, and are determined for each type of vehicle, the model of each vehicle, the model year of each vehicle, the manufacturer of each vehicle, each type of engine, each type of transmission, the geographic region where the vehicle is operated, and/or any other relevant similarity. According to certain embodiments, a threshold value is a value related to a certain type of sensor such that data from the certain type of sensor crossing the threshold value is indicative of potential fault. A threshold may be a maximum value, such that exceeding threshold is indicative of a potential fault, or a threshold may be a minimum value, such that dropping below the threshold is indicative of a potential fault. For example, in regard to the fault of a failed or failing injection control pressure sensor, the earmark of a number of miles exceeding a certain number of miles is a threshold value. In addition, in one embodiment, a threshold value is related to the occurrence of an event such that the event occurring is indicative of a potential fault. For example, in regard to a dead or dying battery, a threshold value is an ECM 110 fault with a signal sensor.

Additionally, according to certain embodiments, acceptable operating ranges are ranges of data such that data outside the range is predictive of a vehicle fault. Acceptable operating ranges concern the statistical relationship of data collected from a certain type of sensor(s) disposed within an individual vehicle to data collected from the same type of sensor(s) disposed within each of a plurality of vehicles, the plurality of which may be a peer group (e.g., same model of vehicle). In various embodiments, the data collected from sensor disposed within the individual vehicle is collected during the same time period in which the data collected from the sensor disposed within each of the plurality of vehicles is collected.

In alternative embodiments, the data collected from the sensor disposed within the individual vehicle is collected during a time period that is subsequent to the time period in which the data collected from the sensor disposed in each of the plurality of vehicles is collected.

For example, in various embodiments in which data collected from a certain type of sensor disposed within an individual vehicle is compared to data collected from the same type of sensor disposed within each of a plurality of vehicles, an acceptable operating range is a predetermined range above and/or below the statistical distribution of the data collected from the certain type of sensor disposed within each of the plurality of vehicles. Therefore, if the statistical distribution of the sensor data from the individual vehicle in comparison to the statistical distribution of the sensor data from the plurality of vehicles in the peer group is outside of the predetermined range, the individual vehicle is potentially going to have a fault. For example, if the degree of difference between the statistical distribution of the injection control pressure for an individual vehicle in relation to the statistical distribution of the injection control pressure from a plurality of vehicles is outside of a predetermined range (e.g., 5%, 10%, or other suitable deviation), then one or more fuel injectors of the individual vehicle is dead or dying. Additionally, for example, if the degree of difference between the statistical distribution of the oil pressure for an individual vehicle in relation to the statistical distribution of the oil pressure from a plurality of vehicles is outside of a predetermined range, then the oil is contaminated and/or is ready to be changed.

According to alternative embodiments, acceptable operating ranges concern the statistical relationship of data collected during a first time period from a certain type of sensor disposed within an individual vehicle to data collected from the same sensor of the vehicle during a second time period. In one embodiment, the second time period is subsequent to the first time period, and in another embodiment, the second time period is shorter in duration than the first time period. In even further embodiments, the second time period is inclusive within the first time period or overlaps with the first time period.

For example, in various embodiments in which data collected during a first time period from a certain type of sensor disposed within an individual vehicle is compared to data collected from the same sensor of the vehicle during a second time period, an acceptable operating range is a predetermined range above and/or below the statistical distribution of the data collected during the first time period from the sensor disposed within the individual vehicle. Therefore, if the data (e.g., a single data point, a series of data points, and an average of data points recorded over a specific period of time) collected during the second time period is outside of the predetermined range, the individual vehicle is potentially going to have a fault. For example, if the degree of difference between the average injection control pressure collected from an individual vehicle recorded once an hour for one week is outside of a predetermined range from the statistical distribution of the injection control pressure data collected from the individual vehicle for one year, then the one or more fuel injectors of the individual vehicle is dead or dying. Additionally, for example, if the degree of difference between the average oil pressure collected from an individual vehicle for oil pressures recorded during one week is outside of a predetermined range from the statistical distribution of the oil pressure data collected from the individual vehicle for one year, then oil is contaminated and/or is ready to be changed.

According to various other embodiments, other types of earmarks, whether threshold values, acceptable operating ranges, or other types of earmarks, are identifiable in relation to any type, model, brand, and/or design of vehicle, engine, or other vehicle component.

Developing Algorithms

Returning to FIG. 6, as shown in Step 640, once the underlying reasons and indicators for vehicle faults have been determined, statistical algorithms are developed that are to be applied to data collected from individual vehicles to identify potential faults. The statistical algorithms take into account the identified earmarks that correspond to potential vehicle faults, and the algorithms are able to identify potential faults by comparing collected data against earmarks of threshold values and acceptable operating ranges.

In regard to predicting faults related to oil, for example, algorithms are developed for identifying an oil pressure decrease below a threshold value of oil pressure, the oil pressure for an individual vehicle dropping below an acceptable operating range of oil pressure for a plurality of vehicles, and the oil pressure for an individual vehicle during a second time period dropping below an acceptable pressure for acceptable operating range for oil pressure of the vehicle during a first time period. Furthermore, algorithms are developed for identifying an oil pressure increase above a threshold value of oil pressure, the oil pressure for an individual vehicle increasing above an acceptable operating range of oil pressure for a plurality of vehicles, and the oil pressure for an individual vehicle during a second time period increasing above an acceptable pressure for acceptable operating range for oil pressure of the vehicle during a first time period.

Additionally, algorithms are developed for identifying the various earmarks that are predictive of a dead or dying battery. For example, algorithms are developed for identifying a battery voltage that is lower than a threshold value of battery voltage, a battery voltage at startup that is lower than a threshold value of battery voltage at startup, a battery voltage at resting state that is lower than a threshold value of battery voltage at resting state, the threshold value of an ECM 110 fault with a signal sensor, the threshold value of an ECM 110 fault with a signal sensor following the replacement of the signal sensor, and/or an air intake temperature that is lower than a threshold value of air intake temperature. Algorithms can also take into account a plurality of earmarks to identify potential faults. For example, in regard to a dead or dying battery, algorithms are developed for identifying a battery voltage that is lower than a threshold value of battery voltage in combination with a threshold value of an alternator sensor warning and/or for a battery voltage that is lower than a threshold value of battery voltage in combination with the number of cycle counts of the starter exceeding a threshold value of starts.

Furthermore, in regard to identifying the potential fault of a dead or dying starter, algorithms are developed for identifying the number of cycle counts of the starter exceeding a threshold value of starts, a battery voltage at startup that is lower than a threshold value of battery voltage at startup, and/or a battery voltage that is lower than a threshold value of battery voltage in combination with the number of cycle counts of the starter exceeding a threshold value of starts, Additionally, algorithms are developed for identifying various earmarks that are predictive of a dead or dying alternator. For example, algorithms are developed for identifying a battery voltage at startup that is lower than a threshold value of battery voltage at startup and/or a threshold value of an alternator fault from the ECM 110 in combination with a threshold value of a failed electrical test. Even more, in regard to identifying the potential fault of a dead or dying ignition switch, an algorithm is developed for identifying the number of cycle counts of the ignition switch exceeding a threshold value of starts.

Additional algorithms are developed to identify faults related to various earmarks that are identified by the ECM 110. For example, in regard to a failed or failing fuel filter, an algorithm is developed for identifying the threshold value of a fuel injector sensor warning. For a failed or failing coolant temperature sensor, an algorithm is developed for identifying a coolant temperature below an acceptable threshold value of coolant temperature in combination with an EGR valve temperature above an acceptable threshold value of EGR temperature. In regard to a cooling system problem, an algorithm is developed for identifying a coolant temperature above an acceptable threshold value of coolant temperature in combination with an EGR valve temperature above an acceptable threshold value of EGR temperature. Algorithms are also developed for the various faults that are predicted by an ABS fault code. For example, to identify the potential faults of a failed or failing wheel sensor, a wheel bearing problem, a wheel seal problem, and a failed overdrive gear, algorithms are developed for identifying the threshold value of an ABS fault code from the ECM 110.

Furthermore, in regard to the various earmarks that are predictive of a failed or failing fuel injector, algorithms are developed for identifying an injection control pressure that has increased above a threshold value of injection control pressure, an injection control pressure that varies more than a threshold value of variance within a certain period of time, injection control pressure for an individual vehicle outside of an acceptable operating range of injection control pressure for a plurality of vehicles, and/or an the threshold value of an injection control pressure sensor fault code from the ECM 110 in combination with a coolant temperature that has decreased below a threshold value of coolant temperature. For leaking hoses, algorithms are developed for identifying a decrease in oil pressure below a threshold value in oil pressure in combination with a coolant temperature that has increased above a threshold value coolant temperature and/or a coolant pressure that has decreased below a threshold value of coolant pressure in combination with a coolant temperature that has increased above a threshold value of coolant temperature. Additionally, for a failed injector control pressure sensor, an algorithm is developed for identifying the number of miles exceeding a threshold value of miles. For the fault of an incorrectly set park brake, an algorithm is developed for identifying a threshold value of the park brake being set in combination with a threshold value of the engine not being at a resting state and/or a threshold value of the park brake not being set in combination with a threshold value of the engine not being at a resting state. Even more, for the fault of a failed park brake assembly, an algorithm is developed for identifying the threshold value of an accelerator sensor alarm from the ECM 110.

According to various other embodiments, other algorithms may be developed to aid in the identification of potential faults in relation to any type, model, brand, and/or design of vehicle, engine, or other vehicle component. The algorithms may be related to various earmarks, including threshold values, acceptable operating ranges, or other types of earmarks.

According to various embodiments, once the statistical algorithms are developed, the statistical algorithms are configured as stored procedures in the Fault Prediction Module 260 that reside within the vehicle maintenance server 130, as shown in Step 650. The Fault Prediction Module 260 is configured to receive real-time and/or delayed data from the Data Collection Module 255 and to apply the statistical algorithm stored procedures to the data to predict any faults or potential faults.

Figure 7:
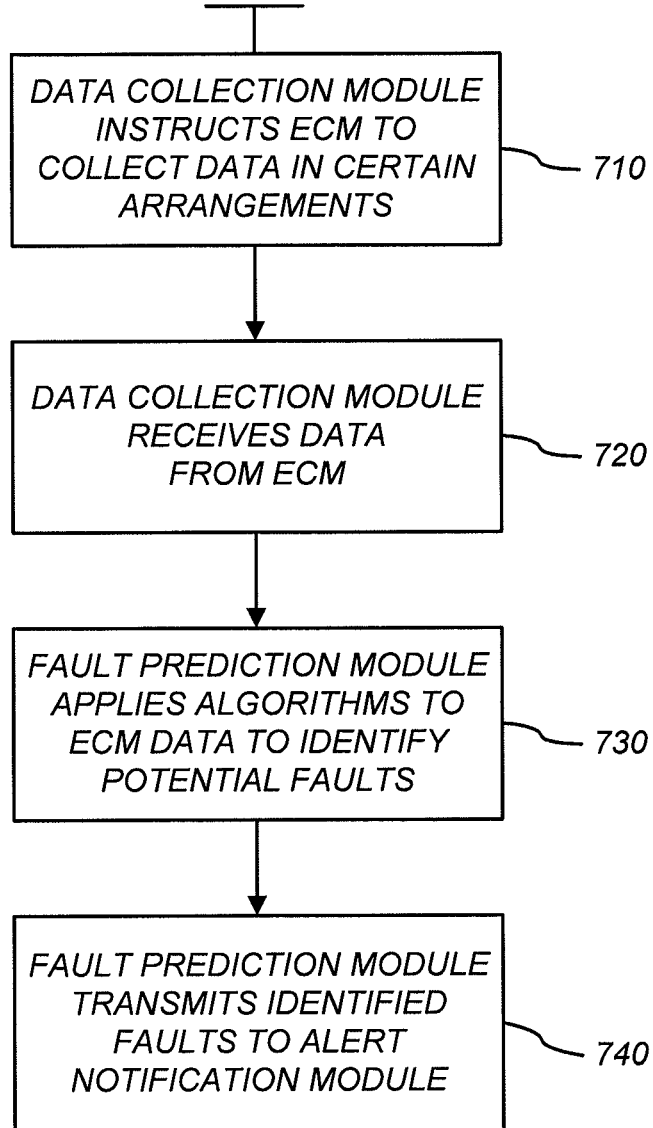

Following Step 650, as shown in Step 710 of FIG. 7, each ECM 110 is instructed by the Data Collection Module 255 to collect data in accordance with certain parameters that will facilitate identification of earmarks by the statistical algorithm stored procedures. According to various embodiments, the certain parameters include collecting sensor signal data at periodic time intervals, collecting sensor signal data at periodic mileage intervals, collecting sensor signal data based on the revolutions per minute of the engine, collecting sensor signal data based on the position of the accelerator pedal, collecting sensor signal data based on the position of the ignition switch, and/or collecting sensor signal data from certain sensors in the at least one vehicle. For example, in regard to collecting sensor data related to oil pressure, the Data Collection Module 255 instructs the ECM 110 to measure the oil pressure when the vehicle is idling and the engine is warmed up. Additionally, for example, the Data Collection Module 255 may instruct the ECM 110 to measure the battery voltage at various specific times, including upon startup, once every five minutes for the first thirty minutes that the vehicle is on, and once an hour while the engine is turned off. In other embodiments, the Data Collection Module 255 may instruct the ECM 110 to collect sensor date according to various other parameters.

Implementation of the Predictive Maintenance System

After algorithms have been established and configured as stored procedures in the Fault Prediction Module 260, the algorithms are used during the operation of a fleet maintenance system. In various embodiments, the system serves as a predictive fault system, an alert notification system, a maintenance scheduling system, an automatic components ordering system, and automatic components dispatching system, or any combination thereof.

Continuing with the embodiment shown in FIG. 7, the ECMs 110 in the plurality of vehicles record data based on the customized instructions stored in the Data Collection Module 255 (as indicated by Step 710), and the Data Collection Module 255 receives data transmitted from the ECMs 110 in real-time or any other appropriate interval, as shown in Step 720. The Data Collection Module 255 then transmits the data to the Fault Prediction Module 260 in real-time or any appropriate interval. According to Step 730, once the Fault Prediction Module 260 receives the data from the Data Collection Module 255, the Fault Prediction Module 260 applies the statistical algorithm stored procedures to the data to identify potential faults.

In regard to oil pressure, for example, the ECMs 110 in the plurality of vehicles record the oil pressure per instructions from the Data Collection Module 255, the oil pressure measurements are transmitted from the ECM 110 to the Data Collection Module 255 and subsequently to the Fault Prediction Module 260, and the Fault Prediction Module 260 applies various algorithms to the recorded oil pressure to identify potential faults. In one embodiment, for example, a threshold-based statistical algorithm stored procedure compares the measured oil pressure from one particular vehicle to a threshold minimum value of oil pressure and a threshold maximum value of oil pressure to determine whether the oil pressure for the particular vehicle has decreased below the minimum or increased above the maximum. If the oil pressure has decreased below the minimum or increased above the maximum, the Fault Prediction Module 260 identifies the increase or decrease as a potential fault with the oil of the one vehicle.

Furthermore, in another embodiment, for example, a peer-to-peer based statistical algorithm stored procedure in the Fault Prediction Module 260 compares oil pressure measurements from one particular vehicle to oil pressure readings from a plurality of vehicles that include the particular vehicle to determine whether the oil pressure of the particular vehicle is outside of an acceptable operating range for oil pressure. The acceptable operating range is a predetermined range above and/or below the statistical distribution of the oil pressures of the plurality of vehicles measured during a certain time period. According to various embodiments, the Fault Prediction Module 260 compares the statistical distribution of the oil pressures from the particular vehicle measured during the certain time period to the statistical distribution of the oil pressures of the plurality of vehicles to determine if the degree of difference between the statistical distribution of the oil pressures from the particular vehicle and the statistical distribution of the oil pressures of the plurality of vehicles is outside of the acceptable operating range. If the degree of difference is outside of the acceptable operating range, then the Fault Prediction Module 260 identifies the difference as a potential fault with the oil of the particular vehicle. In other embodiments, in comparing the statistical distribution of the oil pressures from the particular vehicle to the statistical distribution of the oil pressures of the plurality of vehicles, the oil pressures from the particular vehicle includes oil pressures that are measured during a subsequent time period than the time period in which the oil pressures from the plurality of vehicles were measured.

Even more, in yet another embodiment, for example, a vehicle-based statistical algorithm stored procedure in the Fault Prediction Module 260 that compares oil pressure measurements from a particular vehicle to oil pressure readings the of same vehicle measured during a different period to determine whether the oil pressure of the vehicle is outside of an acceptable operating range for oil pressure. The acceptable operating range is a predetermined range above and/or below the statistical distribution of the oil pressure readings from the vehicle measured during a first time period. According to various embodiments, the Fault Prediction Module 260 compares oil pressure readings from the vehicle measured during a second time period to the statistical distribution of the oil pressure readings from the vehicle measured during the first time period to determine the degree of difference between the oil pressure readings from the vehicle measured during a second period and the statistical distribution of the oil pressure readings from the vehicle measured during the first time period. In certain embodiments, the oil pressure readings measured from the vehicle during the second time period that are compared against the statistical distribution of the oil pressure readings from the vehicle measured during the first time period are, for example, a single oil pressure reading, a series of oil pressure readings, or an average oil pressure reading during the second time period. According to various embodiments, the second time period is subsequent to the first time period, and in other embodiments, the second time period is shorter in duration than the first time period. In even further embodiments, the second time period is inclusive within the first time period or overlaps with the first time period. If the degree of difference is outside of the acceptable operating range, then the Fault Prediction Module 260 identifies the difference as a potential fault with the oil of the vehicle.

Any identified faults are then transmitted to the Alert Notification Module 265, as shown in Step 740. The application of the statistical algorithm stored procedures by the Fault Prediction Module 260 is performed either as a parallel process or as a post process in relation to the reception of data by the Fault Prediction Module 260 from the Data Collection Module 255. In various embodiments, the statistical algorithm stored procedures are applied by the Fault Prediction Module 260 to the data collected by the Data Collection Module 255 at substantially the same time that the data is collected from the ECM 110 by the Data Collection Module 255 and transmitted to the Fault Prediction Module 260. For example, the statistical algorithm stored procedures are applied by the Fault Prediction Module 260 in a substantially real-time manner. Alternatively, the statistical algorithm stored procedures are applied by the Fault Prediction Module 260 to the data collected by the Data Collection Module 255 at a subsequent time after the data is collected by the Data Collection Module 255 and transmitted to the Fault Prediction Module 260. For example, the statistical algorithm stored procedures are applied by the Fault Prediction Module 260 at periodic intervals, at predetermined periods of time, upon the collection of a predetermined amount of data, or based upon various other conditions. Once the statistical algorithm stored procedures are applied to the data, the Fault Prediction Module 260 determines if any of the data has surpassed an earmark, whether the earmark is a threshold value or an acceptable operating range.

Figure 8:
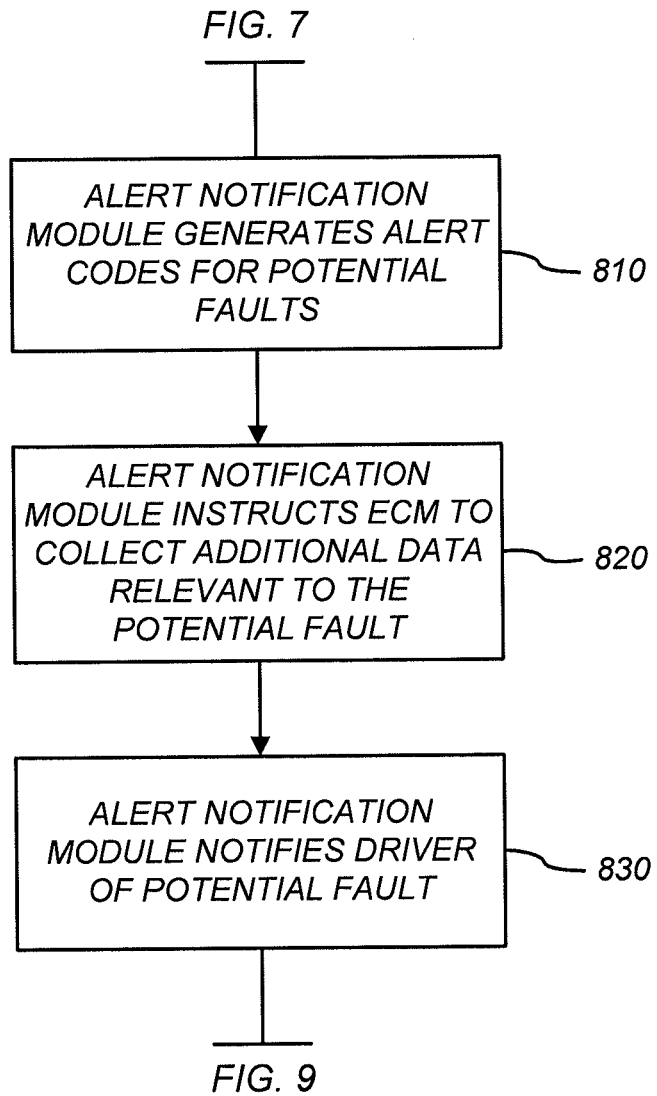
FIG. 8 depicts the steps of a method performed by the Alert Notification Module, according to an embodiment of the invention.

In some embodiments, once a fault or potential fault is detected by the Fault Prediction Module 260, the Fault Prediction Module 260 transmits the fault or potential fault to the Alert Notification Module 265. The Alert Notification Module 265 also receives faults from an ECM fault detection system, which reactively detects faults upon failure of certain components. Upon receiving the fault or potential fault, the Alert Notification Module 265, as depicted in Step 810 of FIG. 8, generates an alert code for the potential fault and assigns a code to the fault that signifies the importance or priority of the fault.

In various embodiments, the fault codes include, for example, a red code, which signifies a high priority repair; a yellow code, which indicates that the vehicle may breakdown in the very near future (e.g., a couple of days); a no-color code, which signifies a low priority repair in which the vehicle does not need to be repaired until a higher priority fault occurs; and a green code, which signifies an issue with mileage or fuel economy and is treated as a high priority red code. In other embodiments, the codes assigned by the Alert Notification Module 265 may have alternative names, and the code categories may be more numerous, less numerous, or a combination of the categories listed above.

After the fault code is assigned, the Alert Notification Module 265 performs one or more various actions. In a particular embodiment, the Alert Notification Module 265 instructs the Data Collection Module 255 to instruct the ECM 110 to collect additional data relevant to the potential fault, as shown in Step 820. For example, if the ECM 110 is taking hourly measurements of the battery voltage in a vehicle and the Fault Prediction Module 260 signals a fault, the Alert Notification Module 265 instructs the Data Collection Module 255 to obtain battery voltage measurements from the ECM 110 every twenty minutes, for example.

In a further embodiment (or in another embodiment), the Alert Notification Module 265 notifies the driver of the potential fault in Step 830 and transmits the alert code to the Maintenance Module 270. The Alert Notification Module 265 can notify the driver of the fault (e.g., automatically) by message to the driver's portable data acquisition device, such as the Delivery Information Acquisition Device ("DIAD") used by UPS drivers, email, phone call, SMS text message, or any other similar method. The notification is dependent upon the fault code assigned to the detected fault. For example, if a red code or a green code is detected, the driver is instructed to bring the vehicle in for an immediate repair. If a yellow code is detected, the driver is notified to bring the vehicle in for repair within the next few days. And if a no-color code is detected, the driver is merely notified of the detection, or the driver is not notified at all.

Figure 9:
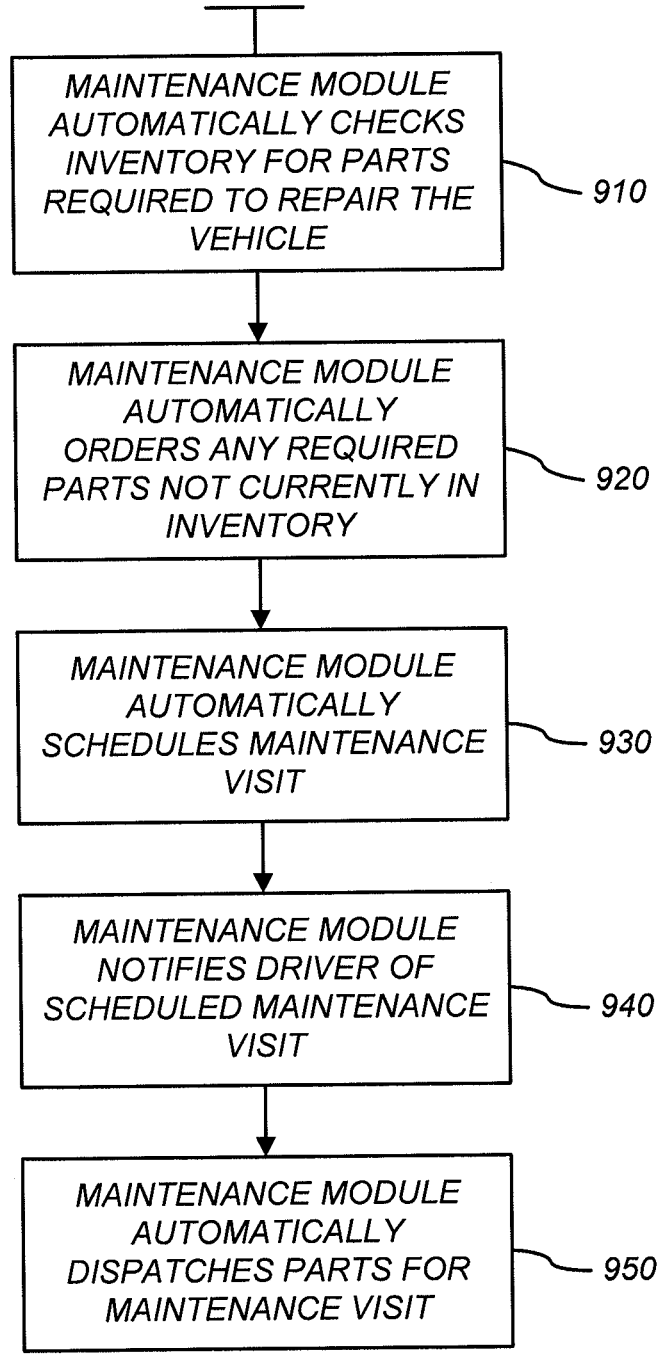
FIG. 9 depicts the steps of a method performed by the Maintenance Module, according to an embodiment of the invention.

With reference to FIG. 9, when the Maintenance Module 270 receives the alert code from the Alert Notification Module 265, the Maintenance Module 270, as shown in Step 910, automatically checks the fleet components inventory to determine if the components required for the repair are currently in stock. If any required components are not in stock, the Maintenance Module 270 automatically orders any required components not currently in the fleet inventory as shown in Step 920.

Then, in Step 930, the Maintenance Module 270 then automatically schedules a maintenance visit, which is based on the scheduled arrival of any ordered components that are not currently in stock. Once the maintenance visit has been scheduled, the Maintenance Module 270 automatically notifies the vehicle driver of the scheduled maintenance visit as shown in Step 940. Additionally, a mechanic is notified of the scheduled maintenance visit, if necessary. Furthermore, in Step 950, the Maintenance Module 270 automatically dispatches the components for the maintenance visit upon availability of the components. Subsequently, any components on the vehicle are repaired to prevent the occurrence of a failure of the vehicle components in advance.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A preventative vehicle maintenance system comprising:
a plurality of vehicles each having an electronic control module (ECM) disposed therein, wherein each ECM is configured to collect data from one or more sensors of the vehicle in which the ECM is disposed;
one or more processors configured to:
  receive sensor signal data collected from the one or more sensors disposed within the respective plurality of vehicles,
  analyze the received sensor signal data from the plurality of vehicles to identify an earmark that is indicative of at least one potential fault condition for one or more vehicle components, wherein the earmark represents acceptable operating ranges;
  receive sensor signal data associated with a first vehicle;
  determine whether the sensor signal data associated with the first vehicle is within a predetermined range of the earmark,
  after determining that the sensor signal data associated with the first vehicle is within the predetermined range of the earmark, generate an alert code comprising indicia indicating an assigned priority for repairing a potential fault for the first vehicle, and
  automatically initiate repair of the first vehicle to prevent the occurrence of a failure of one or more vehicle components in response to detecting the generated alert code, wherein initiating the repair comprises coordinating the repair.

2. The system of claim 1, wherein analyzing the received sensor signal data comprises determining a statistical distribution of the received sensor signal data.

3. The system of claim 2, wherein determining whether sensor signal data associated with a first vehicle is within a predetermined range of the earmark comprises statistically comparing a statistical distribution of the sensor signal data associated with the first vehicle with the statistical distribution of the earmark to determine a degree of difference between the statistical distributions.

4. The system of claim 1, wherein the alert code indicates that the first vehicle needs an oil change.

5. The system of claim 4, wherein the earmark defines an acceptable operating range of oil pressure.

6. The system of claim 1, wherein the alert code indicates that the first vehicle needs a new battery.

7. The system of claim 6, wherein the earmark defines a threshold value of battery voltage.

8. The system of claim 1, wherein the alert code indicates that the first vehicle needs starter maintenance.

9. The system of claim 8, wherein the earmark defines a threshold value of battery voltage and a threshold value of cycle counts of the starter.

10. A method for maintaining a vehicle comprising the steps of:
receiving sensor signal data from each of a plurality of vehicles, wherein the sensor signal data is collected during operation of the respective plurality of vehicles;
analyzing the received sensor signal data from the plurality of vehicles to identify an earmark that is indicative of at least one potential fault condition for one or more vehicle components, wherein the earmark represents acceptable operating ranges;
receiving sensor signal data associated with a first vehicle;
determining whether the sensor signal data associated with the first vehicle is within a predetermined range of the earmark;
after determining that the sensor signal data associated with the first vehicle is within the predetermined range of the earmark, generating an alert code comprising indicia indicating an assigned priority for repairing a potential fault for the first vehicle; and
automatically initiating repair of the first vehicle to prevent the occurrence of a failure of one or more vehicle components in response to detecting the generated alert code, wherein initiating the repair comprises coordinating the repair.

11. The method of claim 10, wherein analyzing the received sensor signal data comprises determining a statistical distribution of the received sensor signal data.

12. The method of claim 11, wherein determining whether sensor signal data associated with a first vehicle is within a predetermined range of the earmark comprises statistically comparing a statistical distribution of the sensor signal data associated with the first vehicle with the statistical distribution of the earmark to determine a degree of difference between the statistical distributions.

13. The method of claim 10, wherein the plurality of vehicles operate in the same geographic region.

14. The method of claim 10, wherein the plurality of vehicles are the same model of vehicle.

15. The method of claim 10, wherein the plurality of vehicles are made by the same manufacturer.

16. The method of claim 10, wherein the alert code indicates that the first vehicle needs an oil change.

17. The method of claim 16, wherein the earmark defines an acceptable operating range of oil pressure.

18. The method of claim 10, wherein the alert code indicates that the particular vehicle needs a new battery.

19. The method of claim 18, wherein the earmark defines a threshold value of battery voltage.

20. The method of claim 10, wherein the alert code indicates that the particular vehicle needs starter maintenance.

21. The method of claim 20, wherein the earmark defines a threshold value of battery voltage and a threshold value of cycle counts of the starter.

22. A computer program product, the computer program product comprising at least one non-transitory computer-readable storage medium having computer-readable program code portions stored therein, the computer-readable program code portions comprising:
an executable portion configured to receive sensor signal data from each of a plurality of vehicles, wherein the sensor signal data is collected during operation of the respective plurality of vehicles;
an executable portion configured to analyze the received sensor signal data from the plurality of vehicles to identify an earmark that is indicative of at least one potential fault condition for one or more vehicle components, wherein the earmark represents acceptable operating ranges;
an executable portion configured to receive sensor signal data associated with a first vehicle;
an executable portion configured to determine whether the sensor signal data associated with the first vehicle is within a predetermined range of the earmark;
an executable portion configured to after determining that the sensor signal data associated with the first vehicle is within the predetermined range of the earmark, generate an alert code comprising indicia indicating an assigned priority for repairing a potential fault for the first vehicle; and
an executable portion configured to automatically initiate repair of the first vehicle to prevent the occurrence of a failure of one or more vehicle components in response to detecting the generated alert code, wherein initiating the repair comprises coordinating the repair.

23. The computer program product of claim 22, wherein analyzing the received sensor signal data comprises determining a statistical distribution of the received sensor signal data.

24. The computer program product of claim 23, wherein determining whether sensor signal data associated with a first vehicle is within a predetermined range of the earmark comprises statistically comparing a statistical distribution of the sensor signal data associated with the first vehicle with the statistical distribution of the earmark to determine a degree of difference between the statistical distributions.

25. The computer program product of claim 22, wherein the alert code indicates that the first vehicle needs an oil change.

26. The computer program product of claim 25, wherein the earmark defines an acceptable operating range of oil pressure.

27. The computer program product of claim 22, wherein the alert code indicates that the particular vehicle needs a battery.

28. The computer program product of claim 27, wherein the earmark defines a threshold value of battery voltage.

29. The computer program product of claim 22, wherein the alert code indicates that the particular vehicle needs starter maintenance.

30. The computer program product of claim 29, wherein the earmark defines a threshold value of battery voltage and a threshold value of cycle counts of the starter.

31. The system of claim 1, wherein the one or more processors are further configured to:
provide data to a communication device notifying a driver of the first vehicle with instructions for facilitating repair of the first vehicle in response to detecting the indicia of the alert code indicating the assigned priority for repairing the potential fault.

32. The method of claim 10, further comprising:
providing data to a communication device notifying a driver of the first vehicle with instructions for facilitating repair of the first vehicle in response to detecting the indicia of the alert code indicating the assigned priority for repairing the potential fault.

33. The computer program product of claim 22, further comprising:
an executable portion configured to provide data to a communication device notifying a driver of the first vehicle with instructions for facilitating repair of the first vehicle in response to detecting the indicia of the alert code indicating the assigned priority for repairing the potential fault.

* * * * *